(No Model.)

F. H. BURKE.
CURRYCOMB.

No. 560,468. Patented May 19, 1896.

Witnesses.

Inventor
F. H. Burke
by Fetherstonhaugh & Co.
Attys

UNITED STATES PATENT OFFICE.

FRANCIS HENRY BURKE, OF PETERBOROUGH, CANADA, ASSIGNOR OF ONE-HALF TO WILLIAM JOSEPH OVEREND, OF SAME PLACE.

CURRYCOMB.

SPECIFICATION forming part of Letters Patent No. 560,468, dated May 19, 1896.

Application filed October 18, 1895. Serial No. 566,107. (No model.)

*To all whom it may concern:*

Be it known that I, FRANCIS HENRY BURKE, horseman, of the town of Peterborough, in the county of Peterborough, in the Province of Ontario, Canada, have invented certain new and useful Improvements in Currycombs, of which the following is a specification.

My invention relates to improvements in currycombs; and the object of the invention is to devise a currycomb of the sheet-metal class which will expeditiously and effectually cleanse horses and other animals; and it consists, essentially, of a currycomb in which the comb is formed from corrugated sheet metal, with outwardly-extending teeth forming portion of the corrugations and peculiarly formed in relation to each other, as hereinafter more particularly explained.

Figure 1:
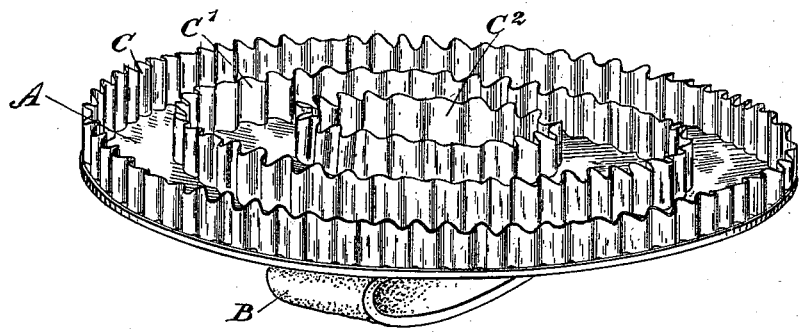
Figure 2:
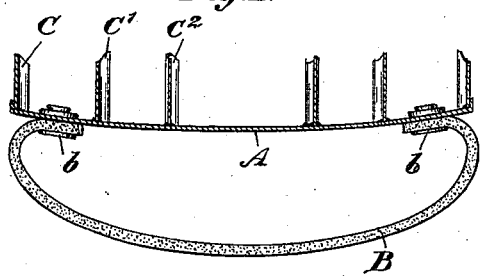
Figure 3:
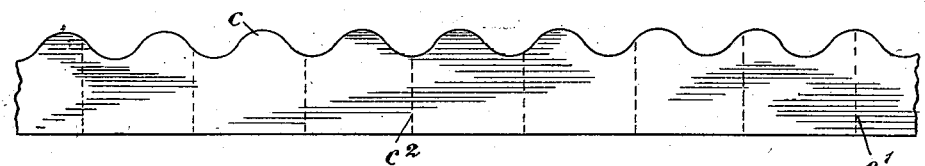
Figure 4:
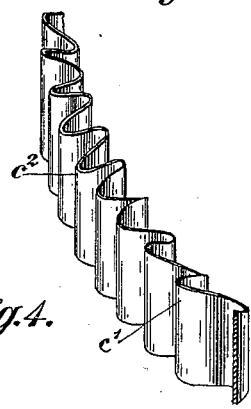

Figure 1 is a perspective view of a currycomb formed in accordance with my invention. Fig. 2 is a cross-section through the comb. Fig. 3 is a side elevation showing portion of a scalloped sheet-metal strip before being bent into corrugated form in accordance with my invention. Fig. 4 is a detail of this strip corrugated in accordance with my invention.

In the drawings like letters of reference indicate corresponding parts in each figure.

A is the back of the comb, which is preferably formed of sheet metal. B is a handle, which is securely riveted to the back at $b$ in any suitable manner, the handle being preferably formed of leather.

C, C', and C² are the outer, intermediate, and inner rings of corrugated teeth, the peculiar construction of which I shall now describe. The corrugated teeth are not formed with the top flush, as in other combs of which I am aware, but are formed with outwardly-extending serrated ends or teeth formed from the scallops $c$, partially extending inwardly and partially extending outwardly. This is graduated in the following manner: The strip is preferably corrugated by being passed between meshing cog-wheels, the teeth of which are of such a size that they gradually advance from the center of the apex of a scallop, as indicated by the dotted line $c'$ in Fig. 3, to the center of the depression of the scallop, as shown by the dotted line $c^2$ shown in the same figure, and from this dotted line to the center of the apex of a scallop, and so on alternately. The effect of this is that the outwardly-extending teeth formed by the scallop partially turn one way and then gradually turn the other way, this of course being caused by the advance of the cogs over the apexes of the scallops. It will thus be seen that this is graduated partially one way and partially the other, as hereinbefore referred to in Fig. 4. The effect of this construction is that in moving the comb over the hair and skin of the animal one way serves to cause the teeth pointing in one direction, or partially so, to plow out the dirt, while the teeth which point in the opposite direction, or more properly incline, serve to collect such dirt when plowed out. The effect of this I find in practice is to very quickly and readily loosen and remove the dirt which is held for the time being in the body of the comb within the corrugations.

I find that a comb such as I describe may not only be given the ordinary motion, but may also be given a circular motion without injuriously affecting the skin or hair.

What I claim as my invention is—

1. In combination in a currycomb, the back, the corrugated rings having their edges scalloped to form teeth, portions of such teeth being beveled outwardly from the interior to exterior, and portions from exterior to interior, and each tooth of the two differently-beveled sets having its highest points out of alinement with the adjacent tooth, substantially as described.

2. In combination, in a currycomb, the back, the corrugated rings having their edges scalloped to form teeth, the high part of each tooth being out of alinement with the succeeding tooth, substantially as described.

FRANCIS HENRY BURKE.

Witnesses:
R. S. WOOD,
I. B. WEDDELL.